United States Patent [19]
Gilbert

[11] 3,821,345
[45] June 28, 1974

[54] METHOD OF SEALING AND BLOW MOLDING TUBULAR PARISONS UTILIZING ALTERNATE PROJECTIONS IN A SEALING MEMBER

[75] Inventor: Dixie E. Gilbert, Pomona, N.Y.

[73] Assignee: Philips Petroleum Company, Bartlesville, Okla.

[22] Filed: May 18, 1972

[21] Appl. No.: 254,741

Related U.S. Application Data

[62] Division of Ser. No. 103,380, Jan. 4, 1971, Pat. No. 3,687,593.

[52] U.S. Cl.................................. 264/98, 264/161
[51] Int. Cl............................................ B29c 17/07
[58] Field of Search............ 264/94, 96, 97, 98, 99, 264/89, 161, 163; 425/387 B, 326 B, 324 B, 302 B, 296, 298, 299, 304

[56] References Cited
UNITED STATES PATENTS

| | | | |
|---|---|---|---|
| 3,363,282 | 1/1968 | Hagen | 264/94 X |
| 3,499,071 | 3/1970 | Hurst | 425/326 B X |
| 3,592,885 | 7/1971 | Goins et al. | 425/326 B X |
| 3,686,379 | 8/1972 | Gilbert | 425/326 B X |
| 3,692,453 | 9/1972 | Quigg | 425/326 B X |

*Primary Examiner*—Jan H. Silbaugh

[57] ABSTRACT

A method of blow molding open end tubular parisons. A parison is heated to orientation temperature, stretched longitudinally, and placed in a molding zone. One end of the parison is flattened to seal and form a tab in the end thereof and small gripping means are simultaneously embedded in the tab in alternate arrangement from both sides thereof. The parison is sheared adjacent the tab, which remains as part of the final product, and the parison is blow molded while the sealed parison is restrained from separating with the gripping means.

6 Claims, 5 Drawing Figures

PATENTED JUN 28 1974 3,821,345

METHOD OF SEALING AND BLOW MOLDING TUBULAR PARISONS UTILIZING ALTERNATE PROJECTIONS IN A SEALING MEMBER

This is a divisional of application Ser. No. 103,380, filed Jan. 4, 1971 now U.S. Pat. No. 3,687,593.

BACKGROUND OF THE INVENTION

This invention relates to an improved method for sealing a hollow parison preparatory to blow molding.

Traditionally, blow molded articles have been formed by the downward extrusion of a molten parison from an annular die into position between opposing mold halves. The mold halves are then closed and fluid pressure introduced into the parison to expand same into conformity with the mold.

Recently, techniques have been developed whereby high strength articles having exceptional sparkle and clarity can be produced by blow molding a parison preform which has been cooled aud thereafter reheated to orientation temperature so as to achieve molecular orientation in the resulting article during the fabrication steps. Such a technique is disclosed in Turner et al., U.S. Pat. No. 3,390,426, the disclosure of which is hereby incorporated by reference. A particularly economical way to produce individual parison preforms is to extrude a continuous length of tubular material and thereafter sever it into individual work pieces, as opposed to injection molding a closed end parison preform, for instance. However, this preferred method of forming individual parison preforms carries with it the inherent disadvantage of providing a preform which is open at each end and which, therefore, must be closed at one end preparatory to blow molding. Thus, in order to operate economically with individual parison preforms, the artisan is faced with the problem of achieving a seal in a parison which is at orientation temperature and thus far below the temperature at which the parison would be easily sealable. Such preforms can be sealed by the application of extremely high pressure from a plurality of directions radially inward toward a point while simultaneously pressing downward on the closed end, but this involves the use of complex equipment and increases the cycle time.

SUMMARY OF THE INVENTION

It is an object of this invention to provide an improved method for achieving difficult sealing operations; it is a further object of this invention to seal an open end parison preform at orientation temperature; it is yet a further object of this invention to provide an improved seal on a parison preform; it is yet a further object of this invention to make possible the economic production of high strength, clear bottles; and it is still yet a further object of this invention to provide a container having indentations in the tab formed on sealing which allows attaching the container to a holding device.

In accordance with this invention a hollow parison is severed and sealed by means of mold halves which have small alternating projections in leadang ends thereof adjacent a severing means.

BRIEF DESCRIPTION OF THE DRAWINGS

In the drawings, forming a part hereof, wherein like reference characters denote like parts in the various views.

DESCRIPTION OF THE PREFERRED EMBODIMENTS

The instant invention is applicable for the sealing of any hollow, elongated article having triangular, square, or round shape or the like, although its primary utility will be found in the sealing of cylindrical parison preforms.

The parison preforms which are sealed in accordance with the instant invention can be made of any orientable material. Suitable materials include a crystalline polymer such as polymers of at least one mono-1-olefin having 2 to 8 carbon atoms per molecule, preferably polymers and copolymers of ethylene, propylene and butene, more preferably polypropylene; and amorphous polymers such as polyvinyl chloride, various styrene/butadiene-containing resins, and the like.

The open end parison preforms to be sealed in accordance with this invention can be formed by any means known in the art, although the preferred means is to simply extrude a tube or pipe in a manner conventional in the art and thereafter sever this continuous extrudate into work pieces of the desired length.

The open end parison preforms are preferably heated to orientation temperature just prior to sealing and blow molding. By orientation temperature it is meant that temperature at which polymers on stretching exhibit an increased strength. For crystalline polymers this temperature is generally in the range of 1°–50° F., preferably 10°–30° F. below the crystalline melting point. For amorphous polymers this temperature is generally 40°–225° F., preferably 100°–175° F. below the homogeneous melt point.

The portion of the mold which constitutes the sealing and severing means can be made of any suitable metal. A preferred metal is Vega steel, hardened to a 59 to 61 Rockwell C hardness. The projections can be either integral with the mold or individual inserts in the mold.

It has been found that persistent problems in obtaining an adequate seal on parisons at orientation temperature are not entirely simply associated with the difficulty of obtaining adhesion at this temperature. Rather, there is a tendency for the freshly formed seal to pull apart on introduction of the full blow pressure to expand the tube out into conformity with the mold walls.

Figure 1:
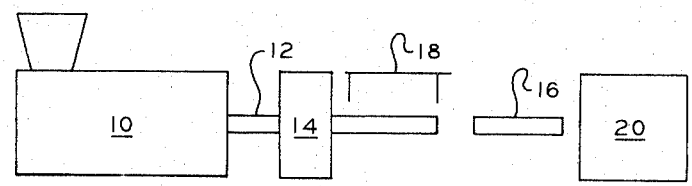
FIG. 1 is a schematic representation of a blow molding apparatus employing the sealing and severing members of the instant invention.
Figure 1:
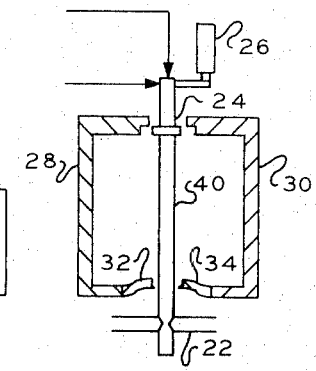

Referring now to the FIGURES, particularly FIG. 1, there is shown an extruder 10 for forming a tubular extrudate 12 which is passed through vacuum cooling and sizing tank 14. Thereafter the thus-formed tube is cut into individual open end parison preforms 16 by cutting mechanism 18. Parison preforms 16 are then passed through reheating oven 20 where they are heated to orientation temperature. They are then transferred to a molding zone by means of transfer mechanism 22 which places the other end of the parison into thread forming head 24. Cylinder 26 serves as a means for effecting relative movement between mechanism 22 and head 24 so as to stretch the parison longitudinally. Leading edges of the lowermost portion of mold halves 28 and 30 comprise inserts 32 and 34 having alternate projections as will be described in detail hereinbelow.

Figure 2:
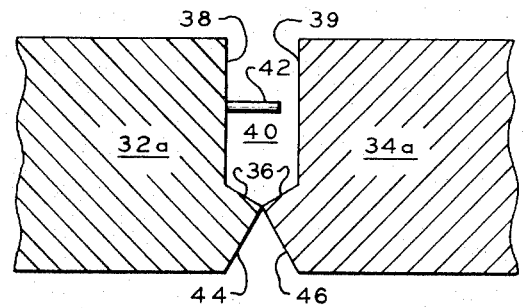
FIG. 2 is a detailed view of one embodiment of the sealing and severing members.
Figure 4:
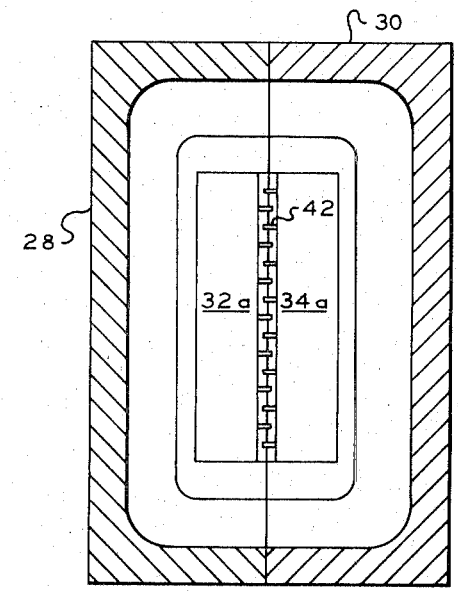
FIG. 4 is a cross-sectional view of a mold looking down on the sealing and severing members.

Referring now to FIG. 2, there is shown inserts 32a and 34a which are similar to inserts 32 and 34 of FIG. 1. Each of said inserts has a pointed blade or severing means 36 which in fully closed position are in abutting relationship so as to sever the parison. Inserts 32a and 34a have leading ends 38 and 39 which cooperate to define a tab molding cavity 40. Projecting from leading end 38 is one of a plurality of pins 42 which generally extend 50–90, preferably 70–80, percent of the distance between said leading ends 38 and 39 in fully closed position. Similar pins (not shown) are disposed along leading end 39 on insert 34a as shown in FIG. 4. Generally the distance between surfaces 38 and 39 will be about 20 to 50 mils, preferably 25 to 45 mils, so as to mold a tab of like thickness, although this can vary somewhat depending on the thickness of the parison. Generally, this distance will be about 10 to 50 percent of a single wall thickness of the parison prior to stretching, the parison generally having a single wall thickness of 100–200, preferably 125–175 mils. The vertical dimension of cavity 40 (that is, between said bottom wall forming surfaces and said severing means) will generally be 20 to 140, preferably 40 to 100 mils so as to mold a tab of like height.

While it is not essential to the invention, it is highly preferred that surfaces 44 and 46 slope back from the severing edge on the side opposite tab mold 40 at an angle such that the included angle when the mold parts are closed is within the range of 25° to 90°, preferably 30° to 47°. In this way, the lateral pressure on the tail portion of the parison which is being severed has a vertical component of force which is sufficient to cause the severed tail portion to fall free from the portion of the parison held within the tab mold.

Figure 3:
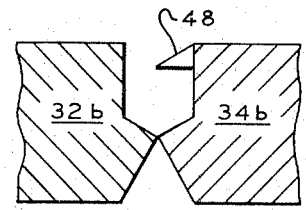
FIG. 3 is a view of another embodiment of the sealing and severing members.

FIG. 3 shows an alternative embodiment wherein inserts 32b and 34b have alternate projections 48, which projections have a flat bottom surface, parallel side surfaces, and an upper surface sloping to a point so as to give wedge shape as viewed from the side and a rectangular shape as viewed from the top.

FIG. 4 is a sectional view looking down on the mold of FIG. 1 in closed position.

Figure 5:
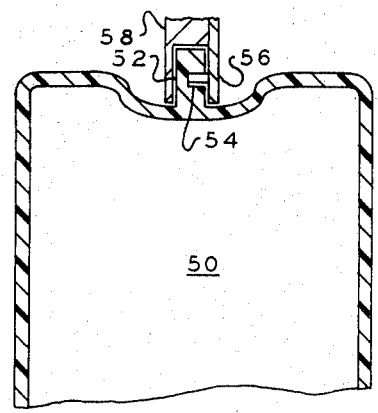
FIG. 5 is a view of a container produced in accordance with the invention in combination with a holding means.

FIG. 5 shows a bottle 50 made from a parison sealed and severed in accordance with the invention wherein the resulting tab 52 having indentations 54 formed by pins 42 is utilized to provide a means for jaws 56 of clamp 58 to securely grip same. Thus, a bottle can be produced which will set flat by virtue of having only a very short depending tab and yet which tab is capable of being gripped securely by a simple and inexpensive clamp. Such an article is particularly useful for a container for fluid such as blood which is suspended in an upside-down condition during use.

It has been found in some instances, it is preferred to preblow the parison slightly before the mold halves close. By careful timing of the sequence of steps wherein the preblow fluid is introduced into the sealed-off parison just after the mold halves begin to close, preblow fluid under the pressure normally utilized for the main blow, that is, pressure of 60 to 200, preferably 90 to 150 psig, can be utilized as the preblow fluid also. In all events where preblow is utilized, a higher pressure must be utilized than the 3 to 6 psig which is standard in the industry for preblowing thoroughly molten parisons. Generally a preblow pressure of at least 25 psig, preferably at least 25 to 50 psig, is utilized. The combination of preblowing and gripping the tab area with alternate projections results in a particularly strong seal. The seal is further improved if the parison is stretched longitudinally in the area to be sealed.

In operation, then, as the mold halves 28 and 30 close, inserts 32 and 34 first flatten the parison near the end to be sealed and then the tab is formed while simultaneously the projections are embedded in same and the tail of the parison is severed. Blow fluid is then introduced to expand the parison out in the conformity with the mold wall, these operations being carried out sequentially so that the parison is at orientation temperature throughout. Because of the alternate pins gripping the tab there is less tendency for the parison to pull apart in the seal area or to pull out of the grasp of the gripping elements during this blowing operation.

While the drawings depict the mold with the thread forming means disposed on top, the apparatus can be disposed in any plane and in many instances it will be preferred to have the thread forming means at the bottom and form the bottle or the like upside down.

Many conventional parts have been omitted in the drawings for the sake of simplicity, but their inclusion is understood by those skilled in the art and is within the scope of the invention.

EXAMPLE I

Propylene homopolymer having a density of 0.095 (ASTM D 1505-63T), and a melt flow of 2 (ASTM D 1238-62T, Condition L), and a crystalline melting point of about 340° F was extruded into tubing having an outside diameter of 0.8-inch and a wall thickness of 0.150-inch. The tubing was cooled to room temperature in a vacuum sizing and quenching chamber and cut into 7-inch lengths. These 7-inch lengths were heated to 320° F. The thus heated blanks were then placed in thread forming jaws such as are shown in FIG. 1 while being held at the other end thereof by gripping fingers similar to those shown in FIG. 1. Relative axial movement was effected between the thread forming means and said gripping fingers to achieve a longitudinal stretch ratio of 2:1. Thereafter, preblow air at a pressure of 50 psig was introduced into the interior of the parison to give a slight radial expansion to the parison. Thereafter mold parts having a sealing configuration identical to that shown in FIG. 2 were closed upon the parison. The distance between the opposing surfaces of the tab forming cavity of the mold was 40 mils. These operations were carried out in immediate succession so that the parison remained at orientation temperature. Main blow fluid at a pressure of 150 psig was then introduced into the interior of the parison to cause it to conform to the shape of the mold to give a biaxially oriented bottle having clear, high strength walls. A tab 40 mils thick was formed extending the length of the seal line, said tab depending from the bottom wall of the bottle a distance of about 80 mils. Resulting bottle had a seal which was resistant to rupture.

CONTROL I

An exactly identical parison was treated in an identical manner to that of Example I except the distance between the opposing faces of the tab forming cavity was 68 mils instead of 40 mils. Several parisons were subjected to an attempted sealing and severing operation using this apparatus without success. In some instances the walls of the parison pulled apart just enough to cause the resulting bottle to leak and in other instances the end of the parison pulled completely out of the tab forming cavity on introduction of blow fluid so that the bottle could not be blown.

CONTROL II

Exactly identical parisons to those of Example I were treated in an identical manner except that the tab forming cavity had a tongue and groove configuration as opposed to alternate projections. The parisons pulled out of the tab forming cavity on introduction of blow fluid and thus said bottles could not be blown.

EXAMPLE II

Parisons identical to those of Example I were treated in an identical manner except that the mold had projections having the configuration shown in FIG. 3. No problem was experienced with the bottles pulling out of the tab forming cavity on the introduction of the blow fluid and the resulting bottles had a strong seal which was resistant to rupture.

While this invention has been described in detail for the purpose of illustration, it is not to be construed as limited thereby but is intended to cover all changes and modifications within the spirit and scope thereof.

I claim:

1. A method for producing a high strength hollow article from an open end tubular parison comprising:
heating said parison to orientation temperature;
stretching said parison longitudinally;
placing said parison in a molding zone;
flattening one end of said parison and forming a tab thus sealing said flattened end while simultaneously embedding small gripping means into said tab in alternate arrangement from both sides;
shearing said parison at a point adjacent said thus embedded gripping means to leave said tab having a height of 20 to 140 mils with said small gripping means embedded therein attached to a main portion of said parison which is to form a bottom wall of said hollow article and thereafter introducing blow air to cause said parison to conform to said molding zone while restraining said sealed parison from separating with said gripping means, said orientation temperature being maintained during said stretching, tab forming, shearing, and blowing operations.

2. A method according to claim 1 wherein said parison has a single wall thickness within the range of 100 to 200 mils and said tab has a thickness within the range of 20 to 50 mils.

3. A method according to claim 1 wherein said parison has a single wall thickness of 125 to 175 mils and said tab has a thickness of 25 to 45 mils.

4. A method according to claim 1 wherein said parison is made of a thermoplastic crystalline material and is heated to an orientation temperature of 1° to 50° F below the crystalline melting point and maintained within that temperature range during said stretching, tab forming, shearing, and blowing operations.

5. A method according to claim 4 wherein said parison is made of polypropylene.

6. A method according to claim 1 wherein said parison is made of a thermoplastic amorphous material and heated to an orientation temperature of 40°–225° F below the homogeneous melt point and maintained at that temperature during said stretching, tab forming, shearing and blowing operation.

* * * * *